Sept. 5, 1967 K. W. FLOCKS 3,340,383

DISCRIMINATORY READER AND PRINTING MACHINE

Filed July 19, 1965

3 Sheets-Sheet 1

Sept. 5, 1967 K. W. FLOCKS 3,340,383

DISCRIMINATORY READER AND PRINTING MACHINE

Filed July 19, 1965 3 Sheets-Sheet 2

INVENTOR
KARL W. FLOCKS

United States Patent Office 3,340,383
Patented Sept. 5, 1967

3,340,383
DISCRIMINATORY READER AND PRINTING MACHINE

Karl W. Flocks, 1329 E St. NW., Washington, D.C. 20004

Filed July 19, 1965, Ser. No. 472,764
11 Claims. (Cl. 235—61.7)

ABSTRACT OF THE DISCLOSURE

A machine and a method for producing a master multi-coded list of items and individual separate lists corresponding to a single code with individual items on each separate list vertically spaced and horizontally aligned with the same items on the master multi-coded list using a programmed type of adding machine, printed and coded tapes and tape reading means. The separate lists may be made by printing an item corresponding to a programmed code and arranging for a space when a non-programmed code is presented to the reading means.

This invention relates to a machine for double entry bookkeeping and more particularly to a specially programmed type of adding machine which is manually fed a single entry list of numbers each of which is individually classified, the machine adding the single entry list of numbers, producing a printed record, such as on tape, of the single entry list and the classification of each entry and, at the same time, producing a second tape, such as a punched tape, which is adapted to be fed through a reader while the same form of adding machine is programmed to accumulate a single classification of numbers from the single entry list and to print on tape as a single entry the selected class with coordinated vertical spacing for horizontal alignment with the corresponding items on the original complete single entry list.

The second readable tape, which may be punched tape produced by the machine, may be fed through the reader several times while the machine is programmed for different classifications, in order to produce a printed tape with porper vertically spaced and horizontally aligned items for each of the classes.

Each of the classes may be separately totaled and the grand total of each of the separate classed totals will equal the total of the original single entry list to "prove" the double entry method of bookkeeping.

Accordingly, the present invention is directed to a machine which will produce a single entry tape and, in addition, a different tape for each class of items with the entries on all the tapes in an aligned relationship to each other and to the original single entry tape.

The invention also seeks to provide a novel method of double entry bookkeeping whereby a single entry classified list is fed into a machine and separate classes of items are read and printed therefrom.

In the present invention, the resulting printed type of the single entry list and printed tapes of each class of items may be placed in a ledger by adhesive means applied to the tapes, in aligned columnar relationship, thereby completing the bookkeeping and placement of the entries in the ledger without any additional work.

Basically, the machine of the present invention has but a single accumulator which is utilized to produce various segregated totals [added columns of figures]. This single accumulator is used in sequence to produce these various segregated totals and after they are produced, the various segregated totals may then be totaled on the same single accumulator to produce a grand total, which according to double entry bookkeeping, will be equal to the total of a single entry of all the items of all the columns making up the segregated totals.

These as well as further advantages which are inherent in the invention will become apparent from the following description, reference being had to the accompanying drawings, wherein.

Figures 1, 2:
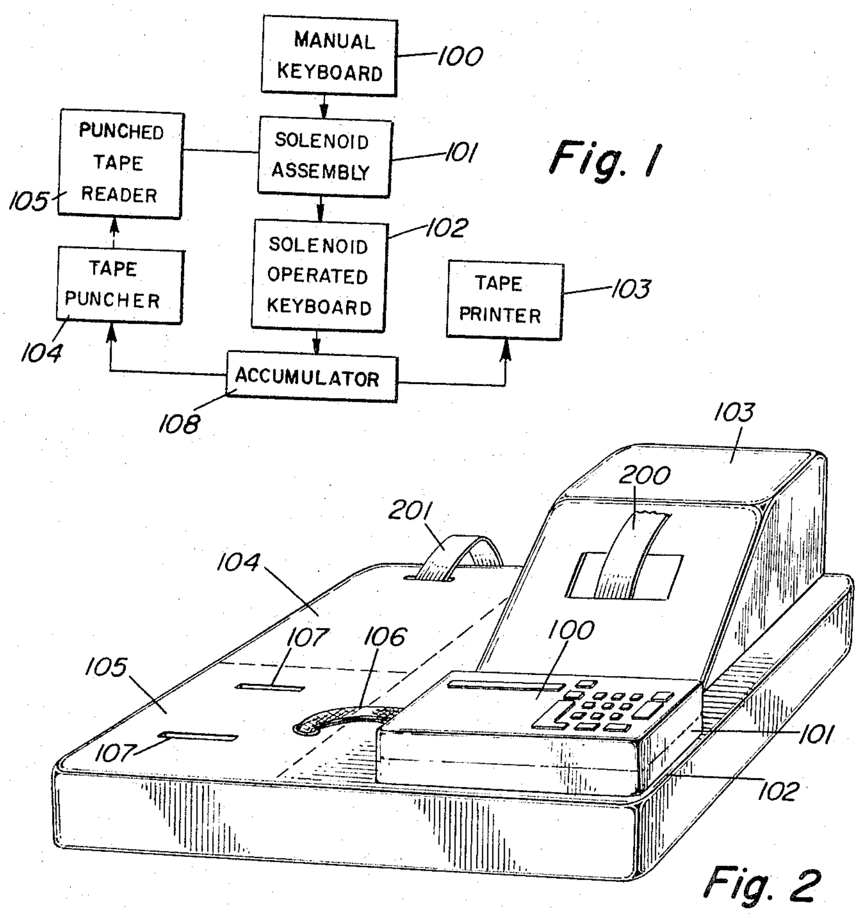
FIG. 1 is a block diagram of the separate portions forming the bookkeeping machine of the present invention.
FIG. 2 is a perspective form of block diagram of the machine of the present invention.

FIG. 1 discloses a form of a bookkeeping machine for use in obtaining printed tapes with one tape being a single entry list of all numbers, with the classification of each number and each of the following tapes showing only the numbers for a single particular class thereon, all tapes being in aligned relationship so that when they are placed in columnar relationship the items on the classified tapes will be in alignment with the same number on the single entry list tape.

A manual key operated keyboard 100 may be placed over a solenoid assembly 101 so that operation of the keys on keyboard 100 activates the solenoids therebeneath in solenoid assembly 101 and thereby causes the activation of keys operated by these solenoids on solenoid operated keyboard 102. Solenoid operated keyboard 102 feeds into a single accumulator 108 which produces two outputs, one of which is to a tape printing apparatus 103 from which is produced the printed tape 200 from the machine of the present invention. The other output from accumulator 108 is to a tape punching apparatus 104 which is used to produce a punched tape 201 which is run through punched tape reader 105 a number of times in the operation of the bookkeeping machine of the present invention. This punched tape reader 105 electrically feeds into solenoid assembly 101 through cable 106 which again, in turn, operates solenoid operated keyboard 102 and thereby again operates accumulator 108 and tape printing apparatus 103. During this part of the process, tape punching apparatus 104 is usually turned off.

FIG. 2 shows the same units described in FIG. 1 in a three dimensional perspective block form set up as they would probably be in a machine of the present invention. As shown in this figure, the manual keyboard section 100 is placed directly over solenoid assembly 101, which is over the keyboard section 102 which would be operated by the solenoid assembly 101. The accumulator 108 which is located inside the body of the machine is not shown. A tape printing apparatus section 103 produces a printed tape 200 while tape punching apparatus section 104 produces a punched tape 201. Punched tape reader 105, shown with openings 107 therein through which the tape is fed, has a cable connection 106 to solenoid assembly 101 through which the information from punched tape is transmitted to the solenoid controls in solenoid assembly 101.

A machine which has most of the elements described and shown in connection with FIGS. 1 and 2 is produced by Friden Incorporated and is referred to as their "Model APTS" or the "Friden Add-Punch." This machine has a manual keyboard section placed directly above a solenoid assembly which is placed directly above the keyboard portion of the machine for operation in the manner contemplated here. This model of the Friden Incorporated machine also incorporates a single accumulator, and also a means for printing a tape as is done in the tape printing section 103, while at the same time producing a punched tape such as is done by tape punching apparatus 104.

The Friden Company also puts out a tape reader unit. The punched tape reader in the present invention may be a unit somewhat like that used in the Friden "Flexowriter" typewriter which may enter the solenoid assembly 101 through wires and cable 106, as shown in FIG. 2. In conjunction with this apparatus, a form of the Friden's selector data may be used for selection of the particular class that will be read out and placed on a printed tape.

Figure 3:
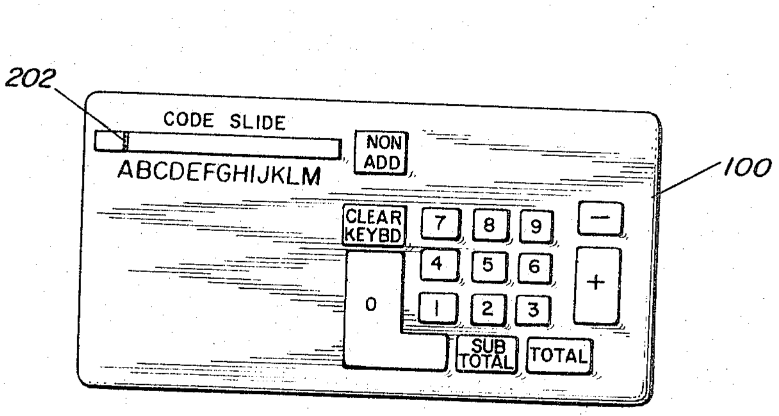
FIG. 3 is an illustration of an enlarged plan view of a form of the manual keyboard portion of the bookkeeping machine of FIG. 2.

Although the individual items of the machine of the present invention may be found among the apparatus produced by the Friden Company and other companies, certain portions of the Friden equipment and that of the other companies must be modified to produce the forms of tape shown in FIGS. 4, 4A, 4B and 4C. The main modification to the Friden equipment would be illustrated in the changed manual keyboard section 100 as shown in FIG. 3. This, of course, necessitates equivalent changes to the solenoid assembly 101 and the keyboard portion 102 of the machine. None of the Friden equipment, nor for that matter any bookkeeping equipment now on the market, is made to produce the aligned tapes shown in FIGS. 4, 4A, 4B and 4C which can be used for the purposes intended for this invention.

Figure 3A:
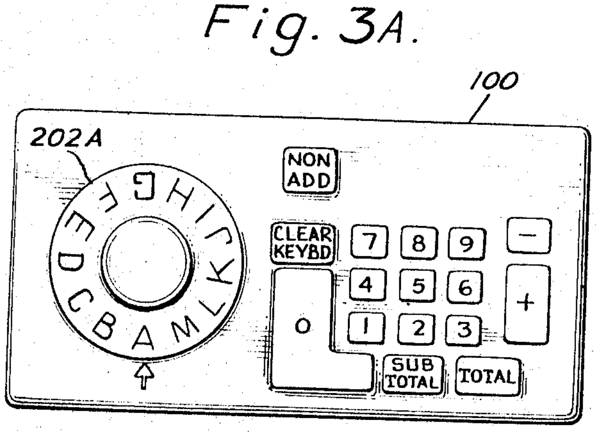
FIGS. 3A and 3B are illustrations of modified keyboard portions of the embodiment of FIG. 3.
Figure 3B:
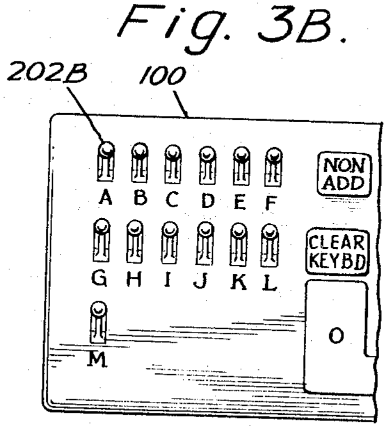

The manual keyboard having keys as designated in FIG. 3 and FIGS. 3A and 3B will, of course, have solenoids in solenoid assembly 101 coordinated with these keys. The utilization of this keyboard in conjunction with the steps in the method of making use of the bookkeeping machine of the present invention is outlined in diagrammatic form in FIG. 5, and by following these steps, the tapes shown in FIGS. 4, 4A, 4B and 4C are formed and utilized.

First a single entry list of numbers and classification of each number must be manually fed into the machine with a key operation of the manual keyboard section 100. This operation involves the entry into the machine of the first single entry list of numbers by the operator and at the same time, the operator sets up each number and slides the code slide 202 shown in FIG. 3 to the proper class such as class A or class B, etc., and then presses the plus (+) key for addition. As shown in FIG. 3, the code slide is in the class B position. This operation sets up in the bookkeeping machine the number to be added, let us say 1.25 and at the same time the code slide key may be depressed at class B indicating that the $1.25 expenditure is for class B type of goods or services.

When all the numbers have been entered into the machine with their proper classification the TOTAL key can then be pressed and the machine will then print a grand total of all the expenditures and goods and services. At this point the difference between the operation of the present bookkeeping machine and the conventional adding machine is that not only will all the figures be added up but they will also show a classification from class A to class M in the particular embodiment illustrated in the figures.

Figure 4:
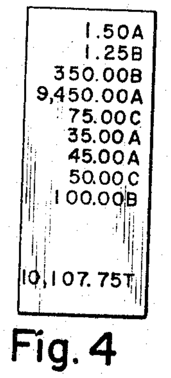
FIGS. 4, 4A, 4B and 4C are forms of printed tape which may be obtained with the present invention.
Figure 4A:
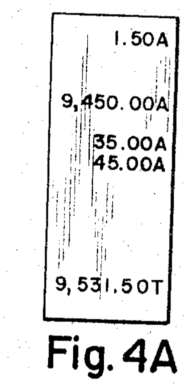
Figure 4B:
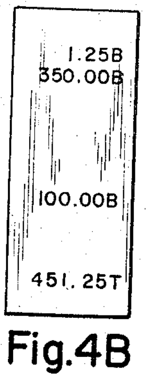
Figure 4C:
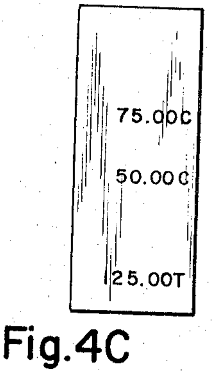

During the operation of the adding machine portion of the bookkeeping machine of the present invention, the switch for the tape puncher 104 will be "on" so that the tape puncher section 104 to the left and to the rear of the machine as shown in FIG. 2 will be producing a punched tape 201 with the sequence in accordance with the printed tape of FIG. 4 but with each individual figure and classification letter in vertical sequence with the preceding one on the punched tape. The hole punching may follow the arrangement of a standard eight channel system illustrated on the Friden "Flexowriter" punch card SP–8634R3 which indicates that they are the IBM channel members. This coordinates with IBM equipment.

Figure 5:
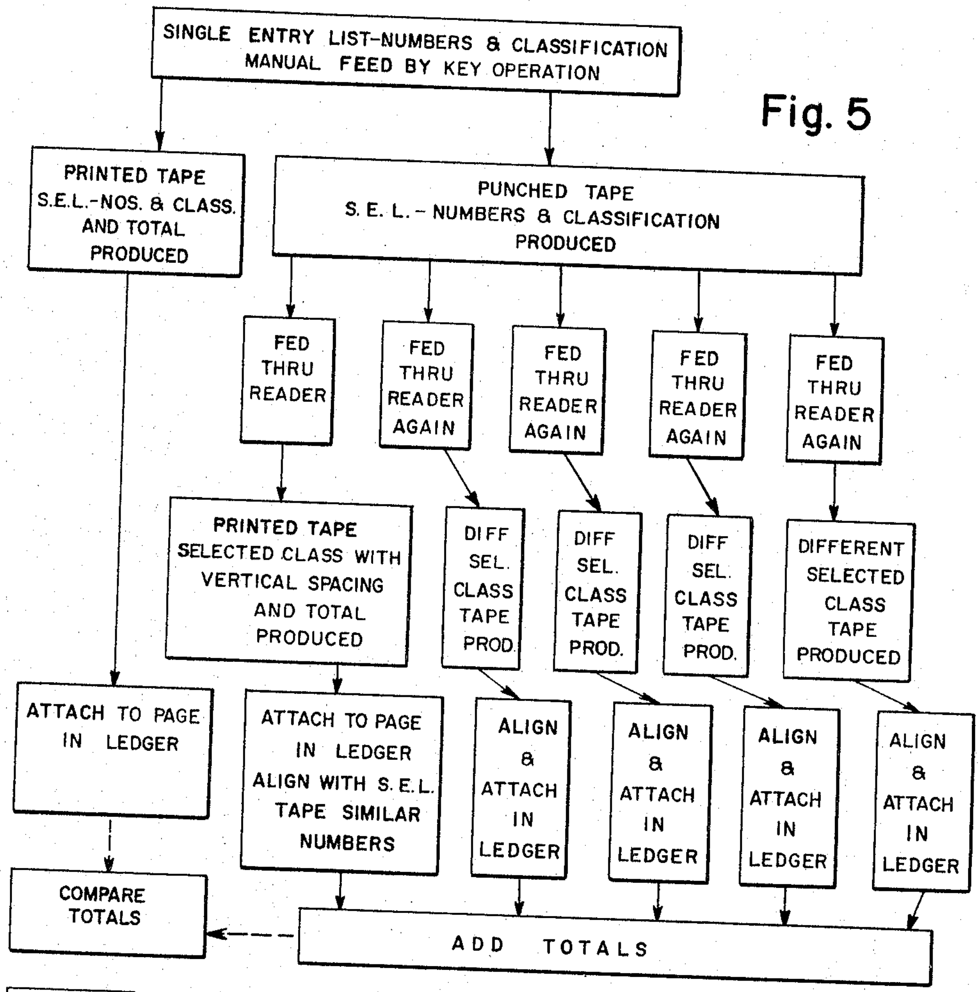
FIG. 5 is a diagrammatic showing of the steps in forming and utilizing the tapes with the bookkeeping machine of the present invention.

Thus, as outlined in FIG. 5, the printed tape of the single entry numbers with their individual classification and their total is produced. Also, a punched tape of the single entry list of numbers and their classification is produced.

Figure 6:
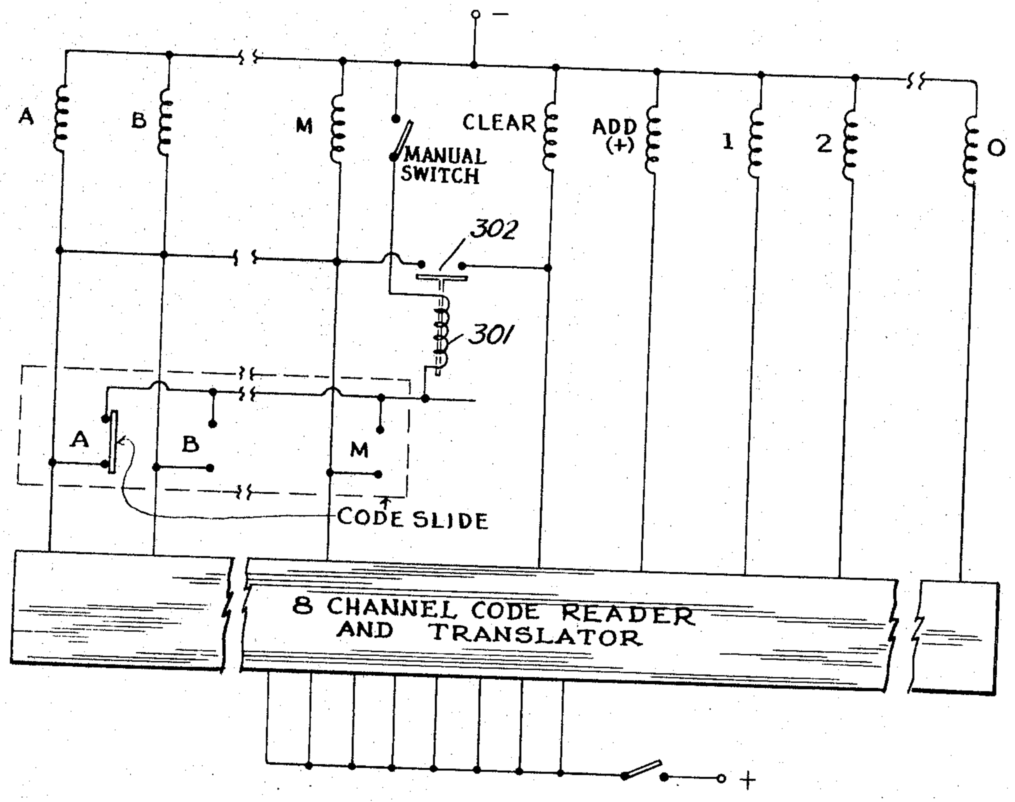
FIG. 6 is a partial schematic of connections which may be used when the master multi-coded tape is fed through the tape reader.

The tape thus produced is now ready to be fed through the tape reader 105. Feeding of the punched tape through the reader 105 translates the punched holes into electrical impulses which operate the solenoid assembly 101. An example of connections for this operation are shown in FIG. 6. Assuming that the tape produced is similar to that shown in FIG. 4, the figures 1 5 0 (1.50) will be first set up in the machine. Assuming also that the code slide is set at A, as in FIG. 6, the bookkeeping machine will be programed so that the plus (+) sign will cause the machine to print on the printed tape as shown in the first item of FIG. 4A. The signal to solenoid A will also activate solenoid coil 301 opening switch 302 making the clear solenoid inoperative. Next, the punched tape will proceed to the second item and will set up the figures 1 2 5 and then, because this item is coded B, there will be a mismatch in the system between connection to the code slide set at A and the reading of classification B from the punched tape. Signal to contacts B which are not connected by slide 202 will not activate coil 301, allowing switch 302 to close thus making the clear keyboard portion operative. The plus (+) key will also be operative and the machine is thus programmed to clear the keyboard and also to produced a clear vertical space when the code on the punch tape does not match the classification for which the machine is set. The reader then proceeds to each of the following items in turn and operates just as it did with respect to the first or second item. The TOTAL key is then pressed manually on the manual keyboard section 100 to obtain a total of all of class A items. This process can be repeated for the class B items and thereafter for any other classified items. The totals of all of the classified items can be added up and should equal the grand total of the original list. This is illustrated in that classified tapes in FIGS. 4A, 4B and 4C have only the items classified A, B or C respectively printed on the respective tape while all items maintain their alignment with the single entry list tape shown in FIG. 4. The totals of the tapes in FIGS. 4A, 4B and 4C should equal the total shown on the tape in FIG. 4.

It will now be understood, that in accordance with the present invention, a machine is provided that is substantially the size of a typewriter and which has a keyboard that looks somewhat like the keyboard of an adding machine, that has a single accumulator, and that is adapted to be operated like an ordinary adding machine to first produce a single entry complete list of all items but with individual items bearing a classification symbol. This first complete single entry list is produced manually with the fingers of the operator punching the keys of the required numbers in the way that an adding machine is usually operated. The next step is more automatic and involves feeding the punched tape produced by the machine to the reader on the machine which electromagnetically operates the keys of the adding machine in such a way as to do more [the machine automatically spaces, which is only duplicated in the normal posting machine] than what the bookkeeper would do on an adding machine by reading off a single classification and adding a column of figures having a single classification. The machine automatically more than reproduces what the bookkeeper would do with the use of but a single accumulator and the only manual part of this step is feeding the tape to the reader thus requiring a minimum of effort on the part of the operator and practically no concentration whatsoever except for programming the machine for a single classification. This step is then repeated for each classification and this repeated step is completely automatic except for programming for each classification and the manual feeding of the punched tape to the reader of the machine. After printed and punched tapes have been made for all classifications, the final step of "proving" in accordance with double entry bookkeeping, is to manually and with concentration add the totals of all of the segregated columns and the grand total should equal the total of the original single entry column. Thus it will be understood, that a new method has been formed and a new machine is thus provided to operate double entry bookkeeping with a minimum of digital operation, a minimum of concentration on the part of the operator and with but a single accumulator.

While the classifying code key has been illustrated in FIG. 3 as a sliding key, it could be a rotating dial 202A as in FIG. 3A such as on a rotating column control knob or it could be a rotating dial such as is present on a dial telephone hand set, or, instead of using a slide or a rotating dial, an additional set of keys as shown in FIG. 3B could be used with one lettered key 202B for each classification. This use of keys would actually be most compatible with the Friden equipment described previously. Also, other forms of switches could be used for such coding.

The tapes as illustrated in FIGS. 4, 4A, 4B and 4C may have an adhesive applied to the back portion and by this means may be attached to a page in a ledger. Each of the tapes A, B and C would be aligned with the single entry list tape numbers and placed in a column identifying the items classified therein. In this way the ledger is in finished printed form and no additional entries are required therein.

It will be obvious to those skilled in the art that various changes may be made without departing from the scope of the invention and therefore the invention is not limited to what is shown in the drawings and described in the specification but only as indicated in the appended claims.

What is claimed is:

1. A double entry bookkeeping machine comprising:
(a) a keyboard including a set of manual keys and a set of solenoids each of which correspond to the keys in said manual set;
(b) said keyboard being operably connected to at least first and second outputs;
(c) a tape printing means connected to said first output for printing characters at least some of which are accumulatable to be discerned by the eye and so read;
(d) a code maker connected to said second output for making codes corresponding to said characters and of a type to be discerned by electric-circuit-affecting means;
(e) electric-circuit-affecting reading means for reading the code produced by said code maker operatively connected to said set of solenoids for control of the solenoids therein;
(f) an accumulator connected to and operable by said manual key set when said manual key set is being operated;
(g) said accumulator also being connected to and operable by said set of solenoids when said solenoid assembly is responding to said reading means;
(h) manually settable classification means for printing one of a plurality of classification symbols associated with a printing and a corresponding accumulation effected by an operation of the manual set of keys and for simultaneously making a classification symbol in code on the tape affected by said tape code maker;
(i) said manual classification means being operative to cause printing and accumulation by said accumulator when said reading means is presented with the code for the classification symbol corresponding to the symbol for which said manual classification means is set, and said manual classification means leaving inoperative said accumulator and said tape printing means when a code for a classification symbol is presented to said reading means which does not correspond to the symbol for which said manual classification means is set.

2. A means of printing a specially spaced, segregated listing of numbers and accumulating the numbers in said segregated list comprising:
(a) means to print an individually classified, integrated vertically spaced list of numbers;
(b) means to produce a running code for each item listed including a classification symbol;
(c) means to accumulate each number as it is printed in said integrated list;
(d) means to print and accumulate the segregated list after said integrated list is completed including;
(e) means to serially read each item on the running code corresponding to the integrated list;
(f) means to reject from printing and accumulation any item on the integrated list having a code for a classification symbol which does not correspond to the code assigned to said segregated list;
(g) means to make one vertical space with each said rejection so as to prepare for a printing in the event the next item does have a classification which corresponds to the code assigned to said segregated list;
(h) means to print and means to accumulate all items on the integrated list having a code for a classification symbol which does correspond to the code assigned to said segregated list;
(i) said means to accumulate each number as it is printed in said integrated list and said means to accumulate all items with a code assigned to said segregated list being the same accumulator means, whereby when said segregated list is placed adjacent said integrated list, the items on said segregated list will be horizontally aligned with the same items on said integrated list.

3. A printing, classifying, and accumulating machine for first printing, classifying and accumulating all items as a single entry, and then printing and accumulating only selectively classified items as a double entry, comprising:
(a) a keyboard having at least first and second outputs, and including a set of manual keys, and a set of solenoids each of which corresponds to a key in said manual set;
(b) a tape character-printing means connected to said first output;
(c) a maker of codes corresponding to said characters and of a type discernible by electric-circuit-affecting means connected to said second output;
(d) electric-circuit-affecting code reading means operatively connected to and controlling said set of solenoids;
(e) an accumulator connected to and operable by said manual key set;
(f) said accumulator being connected to and operable by said set of solenoids when said set is responding to said reading means;
(g) means connected to one of said manual keys and to one of said solenoids for effecting vertical space on said tape and for causing said code maker to make a corresponding code through said second output;
(h) manually settable classification means for printing one of a plurality of classification symbols associated with a printing and a corresponding accumulation effected by an operation of the manual set of keys and for simultaneously causing the code marker to produce the corresponding code for said one classification symbol;
(i) said manual classification means being operative to cause printing and accumulation by said accumulator when said reading means is presented with the code for the classification symbol for which said manual classification means is set;
(j) said manual classification means leaving inoperative said accumulator and said tape printing means but making operative said vertical spacing means when a code for a classification symbol is presented to said reading means which does not correspond to the symbol for which said manual classification means is set.

4. A bookkeeping machine for double entry bookkeeping comprising
a manual keyboard,
a solenoid assembly having solenoids in operative relation with the keys of said manual keyboard,
a solenoid operated keyboard operatively connected to said solenoid assembly and having at least two outputs,
tape printing means operatively connected to one of said outputs of said solenoid operated keyboard,
tape punching means operatively connected to another of said outputs of said solenoid operated keyboard,
tape reading means operatively connected to said solenoid assembly for control of said solenoid assembly,
manual classification means on said manual keyboard,
electrical classification means in said solenoid assembly and said solenoid operated keyboard,
and keyboard clearing means in said solenoid assembly and said solenoid operated keyboard in operative relationship with said manual and electrical classification means and said tape reading means,
said keyboard clearing means operated by a mismatch between said manual classification means, and said electrical classification means controlled from said tape reading means.

5. The bookkeeping machine of claim 4, further characterized by
said manual classification means being a coded slide device.

6. The bookkeeping machine of claim 4, further characterized by
said manual classification means being a plurality of keys in operative contact with solenoids in said solenoid assembly.

7. The bookkeeping machine of claim 4, further characterized by
said manual classification means being a rotative device.

8. A bookkeeping machine for double entry bookkeeping comprising
a manual keyboard,
a solenoid assembly having solenoids in operative relation with the keys of said manual keyboard, a solenoid operated keyboard operatively connected to said solenoid assembly and having at least two outputs,
tape printing means connected to one of said outputs of said solenoid operated keyboard,
tape punching means connected to another of said outputs of said solenoid operated keyboard,
tape reading means operatively connected to said solenoid assembly for control of said solenoid assembly,
an accumulator connected to and operable by said manual keyboard when said manual keyboard is being operated,
said accumulator being connected to and operable by said solenoid assembly when said solenoid assembly is responding to said tape reading means,
manual classification means on said manual keyboard,
electrical classification means in said solenoid assembly and said solenoid operated keyboard,
and keyboard clearing means in said solenoid assembly and said solenoid operated keyboard in operative relationship with said manual and electrical classification means and said tape reading means,
said keyboard clearing means operated by a mismatch between said manual classification means, and said electrical classification means controlled from said tape reading means.

9. The bookkeeping machine of claim 8, further characterized by
said manual classification means being a coded slide device.

10. The bookkeeping machine of claim 8, further characterized by
said manual classification means being a plurality of keys in operative contact with solenoids in said solenoid assembly.

11. The bookkeeping machine of claim 8, further characterized by
said manual classification means being a rotative device.

References Cited

UNITED STATES PATENTS

| | | | |
|---|---|---|---|
| 2,861,739 | 11/1958 | Chall et al. | 235—60.13 |
| 3,089,641 | 5/1963 | Fettig et al. | 235—60.13 |

RICHARD B. WILKINSON, *Primary Examiner.*

STANLEY A. WAL, *Assistant Examiner.*